Oct. 17, 1967 S. KELLER ETAL 3,347,730
PRODUCTION OF SEAM-LIKE CONNECTIONS BETWEEN FLAT FABRIC
MEMBERS BY MEANS OF THERMOPLASTIC MATERIALS
Original Filed Dec. 9, 1958 4 Sheets-Sheet 1

INVENTORS
Siegfried Keller
Kurt Brandt

BY Dean, Fairbank & Hirsch

ATTORNEYS

INVENTORS
Siegfried Keller
Kurt Brandt

BY
ATTORNEYS

INVENTOR
Siegfried Keller
Kurt Brandt

Oct. 17, 1967   S. KELLER ETAL   3,347,730
PRODUCTION OF SEAM-LIKE CONNECTIONS BETWEEN FLAT FABRIC
MEMBERS BY MEANS OF THERMOPLASTIC MATERIALS
Original Filed Dec. 9, 1958
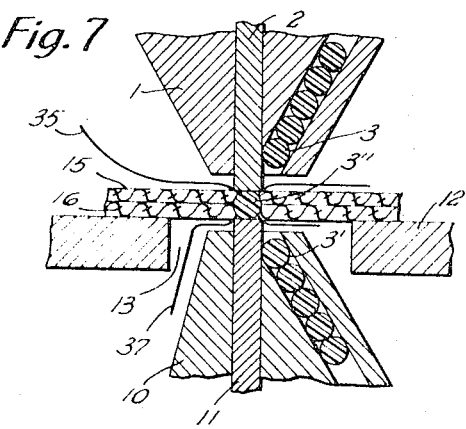
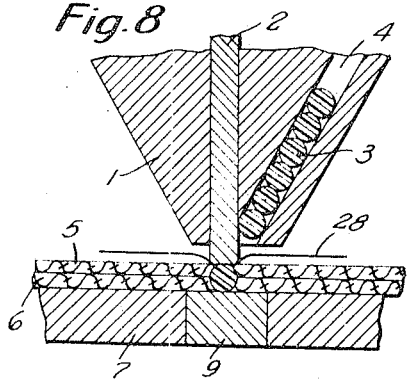
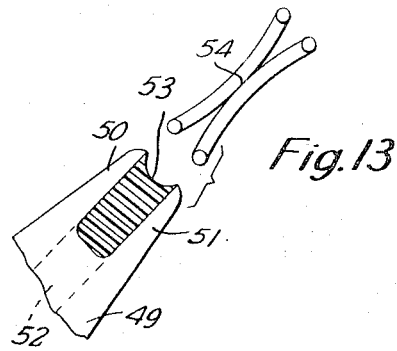
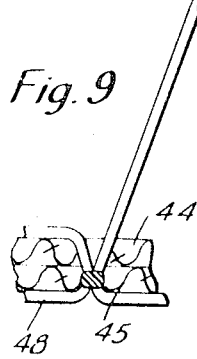
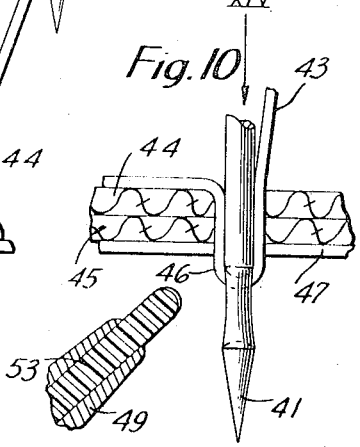
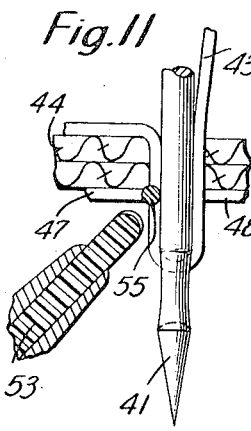
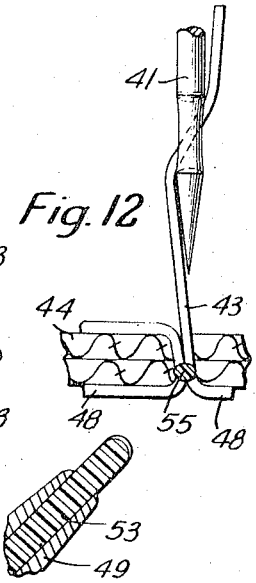
INVENTOR
Siegfried Keller
Kurt Brandt
BY Dean, Fairbank & Hirsch
ATTORNEYS

United States Patent Office 3,347,730
Patented Oct. 17, 1967

3,347,730
PRODUCTION OF SEAM-LIKE CONNECTIONS BETWEEN FLAT FABRIC MEMBERS BY MEANS OF THERMOPLASTIC MATERIALS
Siegfried Keller, Munich-Solln, and Kurt Brandt, Augsburg, Germany, assignors to Messerschmitt A.G., Augsburg, Germany, a corporation of Germany
Original application Dec. 9, 1958, Ser. No. 779,145, now Patent No. 3,122,465, dated Feb. 25, 1964. Divided and this application Feb. 21, 1964, Ser. No. 346,535
8 Claims. (Cl. 156—423)

This application is a division of co-pending application Ser. No. 779,145, filed Dec. 9, 1958, now Patent No. 3,122,465, dated Feb. 25, 1964.

The invention relates to the production of seam-like connection of flat fabric members, in particular of webs, using thermoplastic masses which are introduced into common recesses the mass being liquified and then cooled.

A process is already known in which materials such as webs are connected together by means of thermoplastic foils. In this process, the connection is effected under pressure and the thermoplastic foil is heated by means of a high frequency field in such a way that it partially penetrates into the cavities formed by roughening or perforating the material at the points where connection is to be established.

The invention does not use such foils, which appear to be unsuitable for a number of reasons, and particularly because of the large amount of foil needed and the necessity for roughening or perforating the material prior to the actual process of connection: furthermore, such foils must first be cut to the required shape and then placed separately between the layers of fabric or the like.

In particular, the invention does not use a single, continuous band or thread of thermoplastic material for forming the actual band.

As a further development of the principal idea, the invention also relates to a process for the production of pseudo lock stitches.

It has already frequently been attempted to solve the problem of the lower thread in the lock stitch seams, i.e. to find a way of omitting the tiresome winding and changing of the shuttle for the lower thread and to make it possible to use considerably larger shuttles for the lower thread. All the attempted solutions have so far failed, however, owing to the fact that in the formation of the lock stitch the loop of the needle thread must be taken right round the entire shuttle or store of the lower thread. The possible size of the rotary hook which carries the needle thread around the entire shuttle or store of lower thread is limited, and therefore the maximum size of the shuttle for the lower thread is also limited.

The invention provides a method which enables a shuttle or roll of any desired size to be used for the lower thread.

According to the invention, the production of the pseudo lock stitch seam may be carried out by various processes.

Broadly, the invention consists of a process for the manufacture of seam-like connections in flat flexible fabric members, such as pieces of textile fabric, which includes the steps of repeatedly forming, as a continuous process, common recesses in said members at spaced intervals, introducing directly to each recess, after the formation thereof, a mass, such as a shaped solid plug of thermoplastic bonding material, liquifying said mass, and allowing same to solidify again, thereby to form a series of localized bonds between said pieces.

The further development of the invention deals with a process for producing a pseudo lock stitch seam. The essential feature of a lock stitch seam, namely the holding together of the layers of fabric by a needle thread and a lower thread and the connection of the two threads with each other inside the layers of the fabric are retained in this process. The difference between the normal lock stitch and the pseudo lock stitch produced according to the invention is that in the case of the normal seam the needle thread and the lower thread are intertwined within the layers of the fabric whereas in the process of the invention the upper and lower threads are connected to each other, usually inside the layers of fabric, by means of artificial material, in particular thermoplastic resin. No intertwining of the needle thread and the lower thread takes place in this process and the store of lower thread may be just as large as that of the needle thread.

A further development of the invention consists in that the bonding of the upper to the lower threads by the thermoplastic bonding agent to produce the pseudo lock stitch seam takes place outside the layers or webs, the process being thereby greatly simplified and the operation of sewing becoming very similar to that of sewing normal lock stitch seams.

The invention also includes a supply device for the thermoplastic material.

The various processes of the invention are explained by way of example with reference to various modes of construction shown in the drawings.

The first group of figures show the use of a bonding agent in the form of spheres which are pressed into the fabric from above, thus FIG. 1a shows the phase before the bonding agent is pressed in, FIG. 1b shows the bonding agent pressed in, and FIG. 1c shows the bonding agent melted.

The second group of figures show use of a bonding agent in the form of spheres pressed into the web both from above and from below, thus FIG. 2a shows the phase before the bonding agent is pressed in, FIG. 2b shows the bonding agent pressed in, and FIG. 2c shows the bonding agent melted.

The third group of figures show the use of a bonding agent in the shape of studs, pressed into the fabric from above, thus FIG. 3a shows the phase before the bonding agent is pressed in, FIG. 3b shows the bonding agent pressed in, and FIG. 3c shows the bonding agent melted.

The fourth group of figures show the use of a bonding agent in the form of wires pressed into the fabric from above, thus FIG. 4a shows the phase before the bonding agent is pressed in, FIG. 4b shows the bonding agent pressed in, and FIG. 4c shows the bonding agent melted.

FIG. 7 shows the use of bonding agents in the form of spheres for bonding together the needle thread and the lower thread of a pseudo lock stitch seam.

FIG. 8 shows the use of bonding agents in the form of spheres for the production of a pseudo single chain stitch seam.

FIG. 9 shows a portion of a finished seam and the first working phase in the formation of the pseudo stitch seam when the needle of the sewing machine is descending with the upper thread.

FIG. 10 shows a further phase in the process of forming the seam according to FIG. 9, in which the sewing machine needle has brought the needle thread through the layers of fabric.

FIG. 11 is a further phase in the operation of making a seam according to FIG. 9, in which the upper thread is being bonded to the lower thread.

FIG. 12 shows the final phase in the process according to FIG. 9 of forming a seam, in which the point of bonding between the upper and the lower thread is pulled into the layers of the fabric.

FIG. 13 is a view in the direction of the point of bonding between the upper thread and the lower thread of the pseudo lock stitch seam according to FIG. 9 before bonding takes place.

FIG. 14 is a plan view in the direction XIV, that is, from above, of FIG. 10.

The process according to the main idea of the invention is explained below with reference to the first four groups of figures.

As in a sewing machine, in which the needle is moved mechanically or by means of electromagnetic driving means, a press pin 2 moves in a nozzle-like or sleeve-like housing 1; this pin at the same time acts as means for conducting heat or transmitting ultrasonic energy or, if connected to a high frequency generator, it may form a part of the condensor for producing a high frequency alternating field.

Figure 1A:
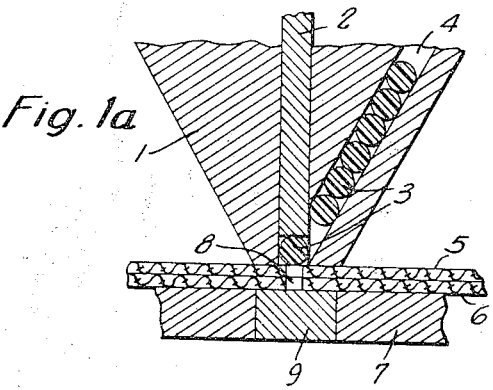

When the press pin 2 is raised (FIG. 1a) a spherical mass of bonding agent 3, preferably of thermoplastic resin, disposed in a magazine or channel 4 in the housing 1, falls underneath the press pin 2. Layers of fabric 5 and 6 which are to be connected are moved on a plate 7 similar to the needle plate of a sewing machine, and thereby comes to lie underneath the press pin 2. The fabric may be provided with a perforation 8 in a preceding operation step.

Figure 1B:
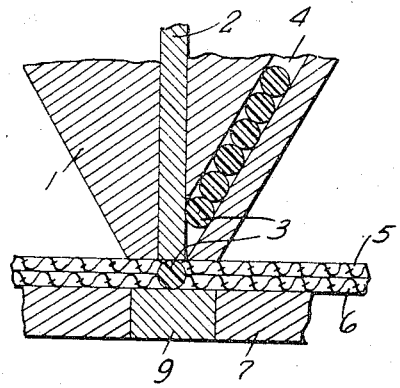

When the press pin 2 is lowered (FIG. 1b) the spherical mass of bonding agent 3 is pressed into the layers of fabric 5 and 6, a plate provided in the plate 7 serving as support.

Figure 1C:
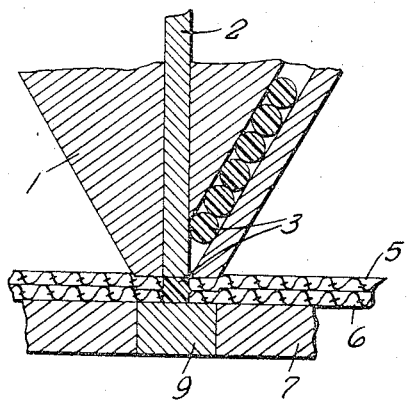

The supporting plate 9 serves at the same time as a means for conducting heat or for the supply of ultrasonic energy, which may, if desired, be controlled to be intermittent, or alternatively the plate may form a condensor plate connected with a high frequency generator for the production of a high frequency alternating field. The spherical mass of bonding agent 3 is heated by means of heat impulses, ultrasonic waves, or high frequency, and is thereby melted, whereby the bonding agent flows into the layers 5 and 6 of the fabric and connects them together on cooling (FIG. 1c).

The movement of the layers of web 5 and 6 on the plate 7 takes place stepwise and is controlled as in a sewing machine, so that the steps may be short, long, forwards, backwards, to the side or in zig-zag movement etc., so that a row of connecting points are formed which result in a seam-like connection of the layers 5 and 6 to each other.

Figure 2A:
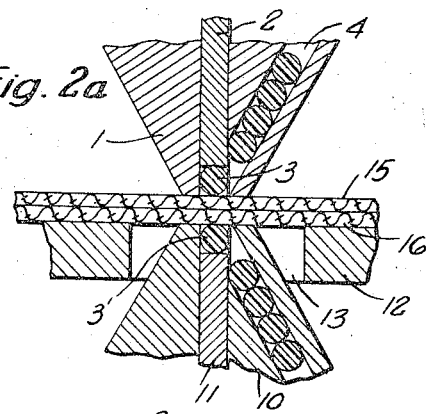
Figure 2B:
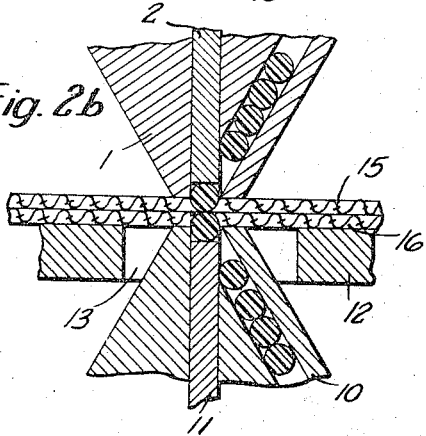
Figure 2C:
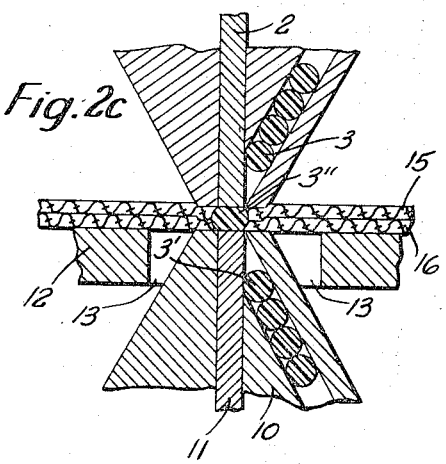

In FIGS. 2a to 2c, in addition to the upper nozzle-like housing 1 with the press pin 2, a similar housing 10 with a similar press pin 11 are arranged opposite to the former, on the underside of the fabric. For this purpose, a plate 12, which carries the layers of fabric 15 and 16, is provided with a recess 13. The bonding agents 3 and 3' are pressed into the layers of fabric 15 and 16 by means of press pins 2 and 11 (FIG. 2b), the press pins 2 and 11 serving also as means for the transfer of heat or of ultrasonic energy or, when connected with a high frequency generator, it may serve as condensor for the production of a high frequency alternating field.

The bonding agent 3, 3' is melted by means of heat, or by the energy from ultrasonic waves, or from a high frequency field, and flows into the layers 15 and 16 of the fabric, resulting in their being bonded together on cooling (FIG. 2c).

Figure 3A:
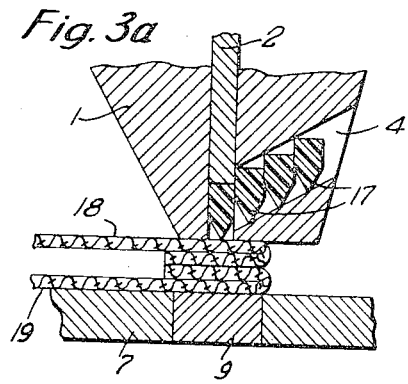
Figure 3B:
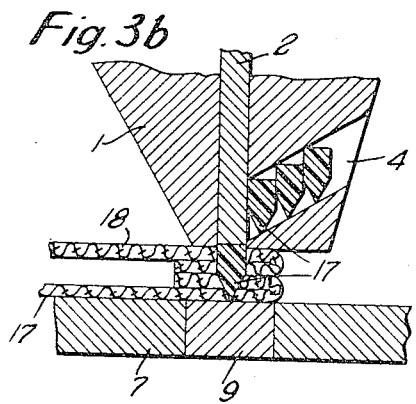
Figure 3C:
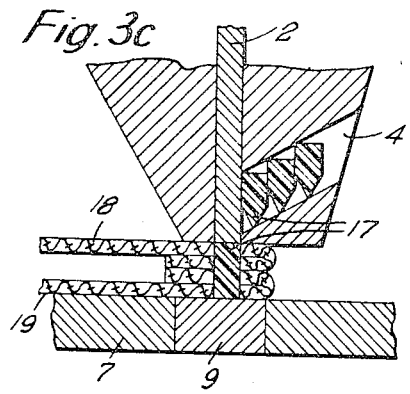

In the example illustrated in FIGS. 3a to 3c, the mass of bonding agent 17 is in the form of studs and each preferably tapered to a point at the bottom so that they can penetrate more readily into the layers 18 and 19. It can be seen from the drawing that the layers of fabric may be folded over at the seam.

Figure 4A:
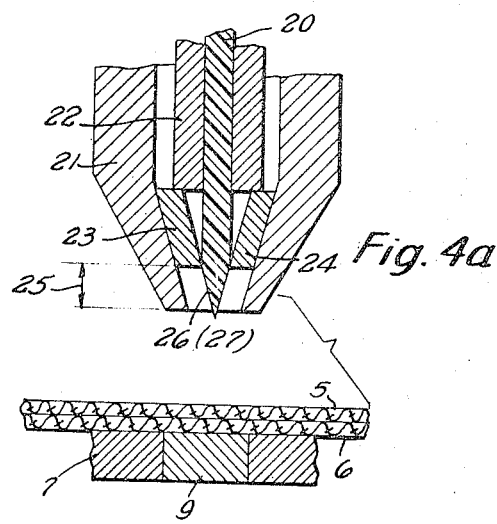
Figure 4B:
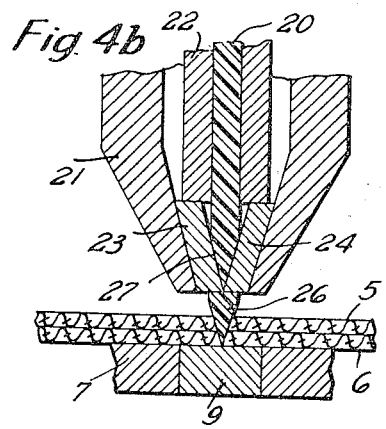
Figure 4C:
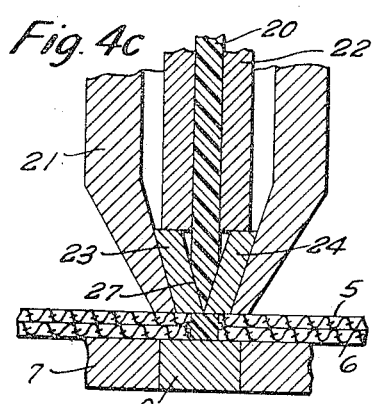

In the example shown in FIGS. 4a to 4c, the bonding agent is in the form of a wire 20, preferably of thermoplastic resin which is wound off a reel or roll, not shown, and is guided in a vertically reciprocating nozzle-like head 21. The head 21 contains a piston 22 which in turn moves claw-like pressure members 23, 24. When the head 21 moves down (FIG. 4) it moves the piston 22 with it, but the stroke of the piston 22 is greater by the amount 25 than the stroke of the head 21, so that the claw-like pressure members 23, 24 press the lower piece 26 of the wire 20 into the layers 5, 6 of the fabric owing to the partially conical shape of the interior of the head 21 and shear off the wire 20 in such a way that one end 27 of the wire is at the same time tapered to a point.

The piston 20 and the pressure members 23, 24 serve at the same time to transmit heat impulses or ultrasonic energy to the piece of wire 26 or alternatively they may form, together with the supporting plate 9, a condensor for the production of a high frequency alternating field; the piece of wire 26 which is pressed into the layers 5 and 6 of the fabric is melted by means of heat impulses or by ultrasonic waves or by heating by high frequency and flows into the layers of fabric 5 and 6, bonding them together on cooling (FIG. 4c).

During the upward stroke of the head 21 and the piston 22 (see FIG. 4a) the wire 20 remains stationary, i.e., the claw-like pressure members 23, 24 diverge again, slide upwards by a controlled, predetermined amount along the wire 20, and then take the wire with them again on the downward movement (FIG. 4b), shearing the wire off in the process.

The process of introducing the pieces of bonding material of thermoplastic resin or the like may be separated either spatially or in time or both from the process of effecting a bond by heating or the like. This method would be used if, for example, there is a risk of the tools which introduce the bonding agent being raised to too high a temperature by the heating process. Such a separation of these steps may be carried out according to the invention in that, for example, an element which is mainly concerned only with heating and therefore with glueing or bonding together the parts of the fabric supplied to it, is placed in the path of the seam at a predetermined distance, which may even be adjustable, behind the member which introduces the bonding agent either by stitching or some other means. Thus, for example, the seam which already contains the bonding particles but is not yet bonded is guided through a preferably strictly localized high frequency field or a field of ultrasonic waves or a source of heat. In this case, intermittent control of the supply of energy which gives rise to the bonding is not absolutely necessary.

In order, for example, to be able to take into account different speeds in the running of the seam, it is preferable to provide, in accordance with the invention, a device which makes it possible to adjust the intensity of the flow of energy which effects the bonding or the like in dependence, for example, on the speed of running of the seam.

Figure 5A:
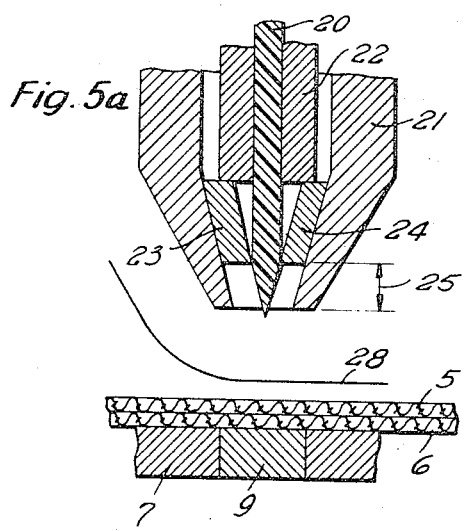
FIGS. 5a, 5b, 5c and FIGS. 6a, 6b, 6c show different phases in the use of a bonding agent in the form of a continuously supplied wire divided into studs for bonding together the upper and lower thread for the purpose of producing a pseudo lock stitch seam and a pseudo single chain stitch seam.
Figure 5B:
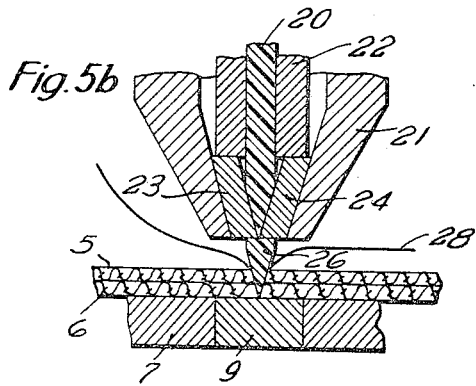
Figure 5C:
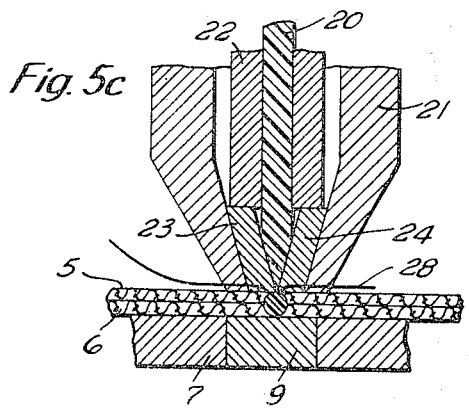

FIGS. 5a to 5c show a modification embodiment of the invention for producing a pseudo single chain stitch seam. Again there are provided the head 21, the piston 22, the claw-like pressure members 23, 24, the wire 20 of thermoplastic resin, the layers of fabric 5, 6, the needle plate 7, and the supporting plate 9 inserted in the latter.

This process, which is otherwise similar to that shown in FIGS. 4a to 4c, is to bind an upper thread, e.g. of textile material, such as yarn or twine 28 with the layers 5, 6 of fabric by means of the piece 26 of thermoplastic wire 20 which has been introduced, so that the pseudo single chain stitch seam is produced (FIG. 5c).

Figure 6A:
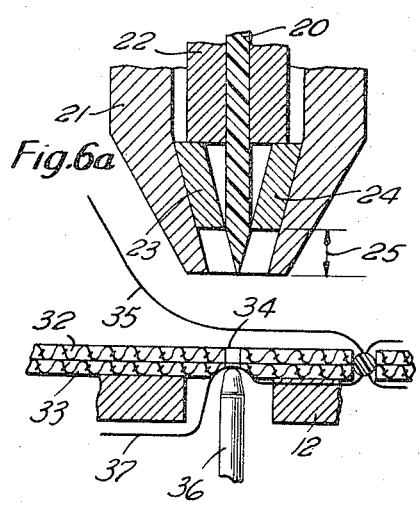
Figure 6B:
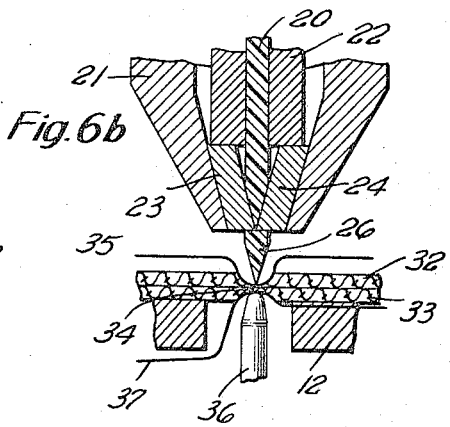
Figure 6C:
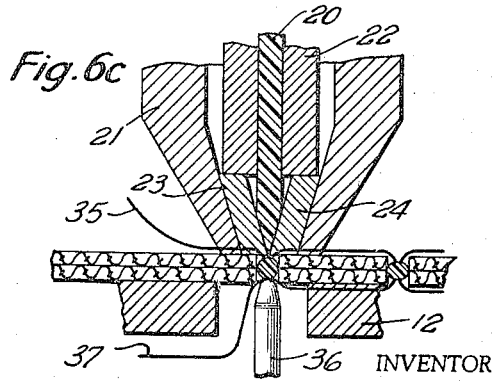

According to FIGS. 6a to 6c, a stronger two-layered web 32, 33 is first perforated in a preceding working step. The web 32, 33 may run, for example, from left to right. As soon as the hole 34 has reached the position underneath the device for the thermoplastic bonding of upper thread 35 and lower thread 37, the pointed end of the thermoplastic wire 20 is severed by suitable means mounted in the head 21, in such a way that a stud shaped piece 26 is cut off and is pressed, according to FIG. 6b, into the hole 34 by the descending head 21, with the cooperation of a finger 36 which acts on it from underneath in the opposite direction; the upper and lower threads are gripped between these parts 26 and 36 in this region and are bonded together by heating the stud 26 of thermoplastic material, as already mentioned, the final bonding particle being a kind of thermoplastic sphere (FIG. 6c) which always unites the upper thread 35 to the lower thread 37 in the perforation 34.

According to FIG. 7, the plate 12, which is cut to the appropriate size and shape, carries the two layers 15, 16 of fabric which are to be bonded together. The pseudo lock stitch steam is formed by the upper thread 35 and the lower thread 37. A point glueing or similar union by thermoplastic agent takes place which, in the example shown, results in a spherical connection between the upper thread 35 and the lower thread 37. It is supplied through corresponding ducts whereby the thermoplastic material is supplied in the form of small spheres 3, 3', both from below and from above, or if necessary, only from one side. The process consists in that the thermoplastic spheres 3, 3' are taken up respectively by the upper press pin 2 and the lower press pin 11, which carry out suitably controlled movements in opposition to each other which are adjusted to the stepwise movement of the fabric feed, and the spheres are pressed into the fabric, which is not necessarily perforated, and take with them the corresponding parts of the upper threads 35 and the lower thread 37 which are pressed into the fabric at the same time and are united by the thermoplastic connection 3''. In the connecting process, the sphere or the like of thermoplastic material is adequately softened by means of a high frequency generator (not shown) or some other known means of heat supply.

FIG. 8 shows an analagous process for the production of a pseudo single chain stitch seam. In this case, there is no lower thread, the upper thread 28 (as in FIGS. 5a to 5c) is fixed into the fabric layers 5, 6 in the manner similar, to that used in the previous example so that, in particular, a connection between the lower layer 6 of fabric and the upper thread 28 is formed.

A further embodiment of the invention is explained below with reference to FIGS. 9 to 14.

Just like in an ordinary sewing machine, a needle 41 (FIG. 9) moves upwards and downwards, and an upper thread 43 is threaded through the eye 42 of the needle. Layers 44, 45 of fabric which are to be united are moved, exactly as in an ordinary sewing machine, by a fabric feed which is not shown, on the needle plate, which is also not shown.

While the fabric feed is in the position of rest the needle 41 (FIG. 10) penetrates so deeply into the layers 44, 45 of fabric that the upper thread 43 forms a loop 46, which projects below the lower surface 47 of the layer 45 of fabric.

The needle 41 is rotated about a small angle (FIG. 14) so that the eye 42 of the needle is at an angle to the direction of feed of the fabric and a tangent to the loop 46 of the upper thread 43 and to the needle 41 gives a straight line A–B which is parallel to the direction of feed of the fabric. The lower thread 48 is so guided on the needle plate, which is not shown, below the layer of fabric 45 that like the straight line A–B it is in contact with the needle 41 and the loop 46 of the needle thread.

A nozzle-like piston 49 moves obliquely up and down below the needle plate and through it. This nozzle-like piston 49 is split in front to form two lips 50 51 (FIG. 13). Inside, in the actual nozzle 52 (FIG. 13) or similar conveyance device, is contained a rapidly hardening bonding agent, for example thermoplastic resin 53. This thermoplastic resin 53 is introduced in the form of a powder, granuale or wire into the nozzle-like piston 49 or some similar conveyance device.

By means of electrical heating or hot air or high frequency current or by some other means, the front part of the thermoplastic material 53 is heated to the melting temperature so that this thermoplastic material 53 is always in a liquid state inside the lips 50, 51 of the nozzle-like piston 49 while the machine is in operation.

At the moment in the sewing operation at which the needle 41 (FIG. 10) has brought the upper thread 43 through the fabric layers 44, 45 and the upper thread 43 has formed a loop 46, and the lower thread 48 lies in contact with the loop 46 of the upper thread 43, the nozzle-like piston 49 is moved upwardly (FIG. 11). The lips 50, 51 of the nozzle-like piston 49 fork over the connecting point 54 between the upper and the lower thread 43, 48 (FIG. 13) to such an extent that the point of contact 54 is covered by the liquid thermoplastic resin 53 which is between the lips 50, 51 of the nozzle-like piston 49.

The nozzle-like piston 49 then descends, returning to its starting position (FIG. 12), having let a blob 55 of thermoplastic resin at the point of contact 54. This quickly sets and thereby establishes the connection between the upper thread 43 and the lower thread 48 (FIG. 12).

As the sewing proceeds, the needle 41 again ascends, the upper thread is tensioned so that the bonded region is pulled into the layers of fabric 44, 45 and no longer projects below the layer of fabric 45 (FIG. 12). Thus, a portion of the seam is completed, and the "sewing" cycle starts again from the beginning, as described above. Continued operation results in a pseudo lock stitch seam.

As many changes could be made in the above method and construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A supply device for introducing a mass of thermoplastic material into each of a succession of recesses in a plurality of superimposed fabric members comprising in combination a housing with a bore therethrough, a ram mounted for reciprocation in said bore, means for supplying a discrete mass, such as a shaped solid plug, of thermoplastic bonding material to said bore for ejection by said ram support means positioned adjacent the outlet end of said bore and slightly spaced therefrom and means connected to said ram for heating said thermoplastic material.

2. A supply device for introducing a mass of thermoplastic material to a succession of recesses in a plurality of superimposed fabric members, comprising in combination a housing with a bore therethrough and a duct therein, a ram mounted for reciprocation in said bore, said bore and said duct being so interrelated that discrete masses of thermoplastic bonding material fed in succession to the duct pass one by one into the bore for ejection by the ram on reciprocation by the latter support means positioned adjacent the outlet end of said bore and slightly spaced therefrom and means connected to said ram for heating said thermoplastic material.

3. A supply device as set forth in claim 2 further comprising means for severing said discrete masses from a continuous length of material.

4. A supply device for introducing a mass of thermoplastic material to a succession of recesses in a plurality of superimposed fabric members comprising in combination a housing with a bore therethrough, a ram, having a duct therethrough, mounted for reciprocation in said bore, said duct being adapted for the supply, in succession of discrete masses of thermoplastic bonding material to the bore for ejection by the ram support means positioned adjacent the outlet end of said bore and slightly spaced therefrom and means connected to said ram for heating said thermoplastic material.

5. A supply device as set forth in claim 4 further comprising means for severing said discrete masses from a continuous length of material.

6. A supply device for introducing a mass of thermoplastic material to a succession of recesses in a plurality of superimposed fabric members, comprising in combination a housing with a bore therethrough, a ram mounted for reciprocation in said bore, cutting means associated with said ram adapted to grip a continuous length of thermoplastic material and, at one end of the ram stroke, to sever a discrete mass therefrom for ejection from the bore by said ram support means positioned adjacent the outlet end of said bore and slightly spaced therefrom and means connected to said ram for heating said thermoplastic material.

7. A supply device as set forth in claim 6 further comprising a counter-pressure plate disposed adjacent the ejection end of said bore to allow passage of said superimposed fabric members.

8. The combination set forth in claim 6 in which said support means comprises a second supply device identical to the first supply device, said supply device being symmetrically disposed with their bores in line and the ejection ends spaced apart to allow the passage of superimposed fabric members and means for heating the thermoplastic material from each supply device.

References Cited

UNITED STATES PATENTS

| | | | |
|---|---|---|---|
| 834,261 | 10/1906 | Chambers | 128—217 |
| 1,262,732 | 4/1918 | Andrews | 128—217 |
| 2,505,906 | 5/1950 | Merritt | 227—80 |
| 2,621,655 | 12/1952 | Olson | 128—217 |

EARL M. BERGERT, *Primary Examiner.*

DOUGLAS J. DRUMMOND, *Examiner.*